United States Patent [19]

Satran et al.

[11] Patent Number: 4,533,283
[45] Date of Patent: Aug. 6, 1985

[54] TOOL HOLDER ASSEMBLY

[75] Inventors: Amir Satran, Kiriat Bialik; Shmuel Elka, Nahariya, both of Israel

[73] Assignee: Iscar Ltd., Nahariya, Israel

[21] Appl. No.: 590,739

[22] Filed: Mar. 16, 1984

Related U.S. Application Data

[63] Continuation of Ser. No. 314,337, Oct. 23, 1981, abandoned.

[30] Foreign Application Priority Data

Oct. 29, 1981 [IL] Israel ............................. 61368

[51] Int. Cl.³ ............................................. B26D 1/11
[52] U.S. Cl. .................................. 407/111; 407/104; 407/106
[58] Field of Search ............ 407/41, 48, 49, 103–108, 407/111, 93, 77, 86, 89

[56] References Cited

U.S. PATENT DOCUMENTS

| | | | |
|---|---|---|---|
| 1,171,164 | 2/1916 | Amborn | 407/93 |
| 3,176,377 | 4/1965 | Milewski | 407/77 |
| 3,469,296 | 9/1969 | Reeve et al. | 407/105 |
| 3,488,823 | 1/1970 | Wirfelt | 407/103 |
| 3,500,522 | 3/1970 | Stier | 407/111 |
| 3,545,060 | 12/1970 | Kezran | 407/103 |
| 3,611,527 | 10/1971 | Hudson | 407/86 |
| 3,708,843 | 1/1973 | Erkfritz | 407/48 |
| 3,785,417 | 1/1974 | Vora | 407/48 |
| 3,885,282 | 5/1975 | Pataky | 407/89 |
| 3,997,951 | 12/1976 | Williscraft | 407/105 |
| 4,334,807 | 6/1982 | Nessel | 407/103 |

FOREIGN PATENT DOCUMENTS

| | | | |
|---|---|---|---|
| 961254 | of 1975 | Canada | 407/111 |
| 1047240 | of 1979 | Canada | 407/111 |
| 2647546 | of 1978 | Fed. Rep. of Germany | 407/111 |
| 623670 | of 1978 | U.S.S.R. | 407/103 |

*Primary Examiner*—Leonidas Vlachos
*Assistant Examiner*—Jerry Kearns
*Attorney, Agent, or Firm*—Ladas & Parry

[57] ABSTRACT

A tool holder assembly for retaining a removable cutting insert on a tool holder, said assembly including a recess on the holder for receiving the insert, a side clamp juxtaposed to the insert and movable in the recess, means for positioning the insert and means for moving the clamp translationally and rotationally to clamp the insert against the insert positioning means.

3 Claims, 3 Drawing Figures

TOOL HOLDER ASSEMBLY

This is a continuation of co-pending application Ser. No. 314,337, filed Oct. 23, 1981, now abandoned.

FIELD OF THE INVENTION

The present invention relates to tool holder arrangements and more particularly to tool holders for clamp and pin held apertured cutting inserts.

BACKGROUND OF THE INVENTION

Cutting inserts are now widely used as the part of the tool that does the actual cutting. The cutting inserts are held on recesses or seat portions of the shank of the tool holder in a manner facilitating their replacement as they are worn.

Many holding devices have been tried since the first use of cutting inserts. Among the classic cutting inserts holding devices are external clamps and internal screw holders.

Clamping arrangements must hold the insert tightly and reliably in place overcoming the stresses and strains of the cutting operation. Ideally an insert clamping arrangement should also enable precise replacement of the removed insert without requiring precision measurements. The insert clamping means should be designed to minimize interference with the flow of chips generated during the cutting operation. Present day tool insert holding arrangements lack some or all of the above named features. For example, some of the tool holder arrangements use clamps which interfere with the flow of the chips. Other of the tool holder arrangements use clamps which cannot reliably hold the cutting insert against the stresses and strains of the cutting operation. Some of the tool holder arrangements for cutting inserts only apply pressure on two sides of the inserts and therefore the tool inserts often come loose during the cutting operation. Other arrangements hold the inserts reliably; however, when these holding mechanisms are loosened then precise and rigorous measurements are required to replace the insert on the seat indexed into the position prior to removal. This is time consuming and therefore expensive.

It is an object of the present invention to provide new and improved clamping tool holder arrangements for cutting inserts in which the above referred to adversities and disadvantages are subsantially reduced or overcome.

SUMMARY OF THE INVENTION

According to the present invention a tool holder assembly for retaining a cutting insert on a tool holder comprises a recess for receiving said insert on said holder, side clamp means juxtaposed to said insert and movable in said recess, insert positioning means for positioning said insert in said recess for cutting operations, and means for displacing said side clamp means translationally and rotationally to clamp said insert against said insert positioning means.

BRIEF DESCRIPTION OF THE DRAWINGS

The invention will be more fully understood and appreciated from the following detailed description taken in conjunction with the drawings in which.

GENERAL DESCRIPTION

Figure 3:
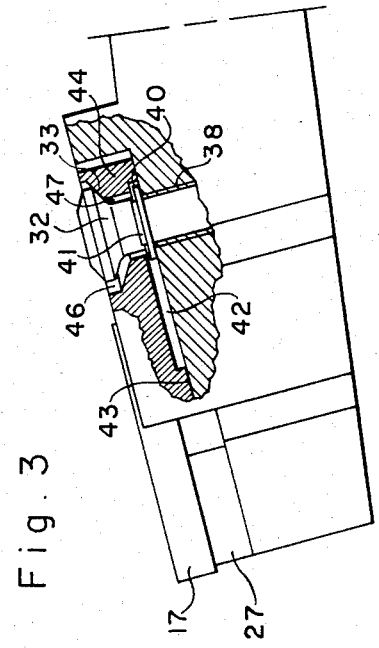
FIG. 3 is a side view of the tool holder with an indexable insert thereon.
Figure 1:
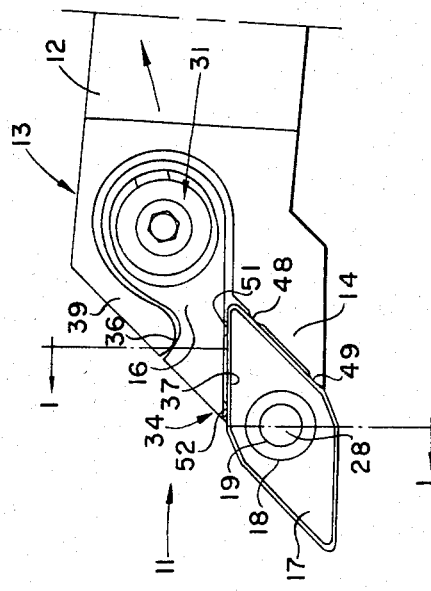
FIG. 1 is a plan view of the tool holder with an indexable insert thereon.

The tool holder assembly 11 shown in FIG. 1 includes the shank or tool holder 12 having a recess portion 13 at the front end thereof. The recess portion is shown with a fixed wall 14 at one side thereof. Spaced apart from the fixed wall is a side clamp 16, whereby between the wall 14 and the clamp 16 there is a substantially V-shaped section designed to receive cutting inserts, such as insert 17. It should be understood that the section is not necessarily limited to V-shapes.

Figure 2:
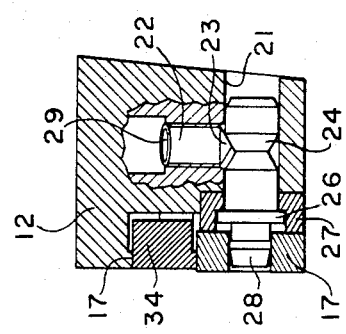
FIG. 2 is a sectional view of the tool holder taken along the planes defined by line 1—1 and looking in the direction of the arrows 1—1.

The insert 17 has an aperture 18 therethrough for receiving a pin 19 thereat. Pin 19 as best seen in FIG. 2 is retained in aperture 21 in the tool holder 12.

Means are provided for securing the pin to the tool holder. More particularly as best seen in FIG. 2 a set screw 22 is provided. The set screw 22 is located so that its conical tip 23 abuts a groove 24 in the pin 19. The set screw 22 has an extended ring portion 26 which abuts against an anvil 27 forcing the anvil against the tool holder. The head of the pin 28 extends into the aperture in the insert 17 and is one of the locating points that sets and retains the insert in its position. The set screw 22 is shown having a characterized socket section 29 for receiving a wrench to tighten and loosen the set screw.

Means are provided for displacing the clamp member 16. The means includes a locking screw 31 which extends through elongated bore 47 in the clamp member. The locking screw has a conically shaped head 32 which matches the inclined surface 33 in the countersunk portion of the clamp 16. Disposed opposite of the inclined plane 33 is a release recess, providing room between the head 32 and the countersunk portion of the clamp. When the locking screw is tightened into the tool holder body the opposing conical sections 32 and 33 force the clamp 16 to move longitudinally in the direction of the arrow "A".

Means are provided for converting the longitudinal displacement of clamp 16 to rotational displacement. More particularly, in a preferred embodiment, the clamp member 16 has a wedge portion 34 defined by the walls 36 and 37 of the clamp 16 which are widest at the outermost portion and become narrower in the direction of the locking screw 31. The wedge portion 34 in cooperation with a support wall section 39, which is shown as arcuately shaped, forces the clamp 16 into rotational motion to abut the insert 17 when the locking screw 31 is tightened into a threaded bore 38 in the body of the tool holder 12.

A spring washer 40 is provided, in a preferred embodiment. The spring washer 40 fits into a slot 41 in locking screw 31. Also a cutaway section 42 is cut on the underside of the clamp 16 to provide room for the washer 41. The cutaway section is defined by the support surfaces 43 and 44 on which the clamp abuts the top surface of the recess of the tool holder 12.

In a preferred embodiment abutting points 48 and 49 are shown extending from fixed wall portion 14. Similarly abutting points 51 and 52 are shown extending from the clamp 16 to abut against the insert.

In operation the tool holder assembly 11 is prepared by first tightening the set screw 22 to properly position the pin 19 with the extended ring 26 firmly abutting against the anvil 27. It should be noted at this point that in another embodiment, the invention could operate just as effectively without an anvil. Additionally it is within the scope of the invention to have the side clamp cooperate with pin 19 for retaining an indexable insert in an open pocket seat, i.e. without a fixed wall.

The insert 17 is then set over the pin 19, where it fits rather loosely in the seat or recess 13. At this point the locking screw 31 is turned to tighten it in threaded bore 38. Tightening the locking screw 31 forces the conically shaped head 32 against the inclined plane portion 33 of the clamp 16. This forces the clamp 16 to move longitudinally towards the rear of the recess. The wedge shape portion of the clamp 34 in cooperation with the fixed supporting wall portion 39 causes the clamp 16 to rotate around the locking screw with the abutting points 51 and 52 pushing against the insert and causing the insert to push against wall portion abutting points 48 and 49 and also forcing the inner wall of the aperture 18 of the insert 17 against the pin 19.

There are thus three surfaces on the insert used for positioning and retaining the inserts. They are the surface contacted by the clamp 16, the surface contacted by the wall portion 14 and the surface contacted by the pin 19.

Loosening the clamp screw 16 enables removal of the insert and replacing the insert easily. Nonetheless the insert is solidly held and properly reliably positioned. The spring washer 40 aids in releasing the clamp abutting the insert for the removal of the insert.

The clamp is a side clamp, not in the path of the chips, which nonetheless reliably positions and retains the insert during the entire cutting operation.

While the principles of the invention have been described above in connection with specific apparatus and applications, it is to be understood that this description is made by way of example only and not as a limitation on the scope of the invention.

We claim:

1. A holder assembly for retaining a cutting tool having a V-shaped portion therein, comprising:

a cutting tool having a V-shaped portion and top and bottom surfaces;

a tool holder defining a recess, including a portion definable as the tool recess for receiving said V-shaped portion of said cutting tool, and having a fixed stationary post extending upwardly therefrom, with the tool having a hole extending between its top and bottom opposite surfaces whereby said tool is retainable in said tool recess by the post extending into the tool's hole and said tool holder further includes first and second stationary walls on opposite sides of said recess, said first stationary wall defining one side of said tool recess; said secondary stationary wall having a curved end surface;

clamp means in said recess and means pivotally and slidably mounting said clamp means in said recess, said clamp means including a wedge portion with a wedging wal facing said first wall and an opposite curved shaped side juxtaposed said curved end surface of said second stationary wall; and means for displacing said clamp means to slidably move in a direction so as to wedge the curved shaped side of said wedge portion about the curved end surface of said second wall at a single point of contact, and to pivot said clamp toward said first stationary wall so that the tool becomes wedged by the post, and the V-shaped tool portion is wedged between the first stationary wall and the wedging wall of the clamp, with the angle between the first stationary wall and said wedging wall being variable to accommodate variations in the angle between the tool's walls forming said V.

2. A tool holder assembly as recited in claim 1 wherein the angle between the tool's sides for the V-shaped portion is acute.

3. A tool holder assembly as recited in claim 1 wherein said tool is diamond shaped with one part of the tool with one acute angle being wedged in said tool recess and the other part of the tool with an opposite acute angle forming a cutting edge, with said clamp means being moved in a direction for tool wedging which is away from the cutting edge.

* * * * *